June 12, 1928.
S. J. BOUGHTON
UNIVERSAL JOINT
Filed July 26, 1926
1,673,492
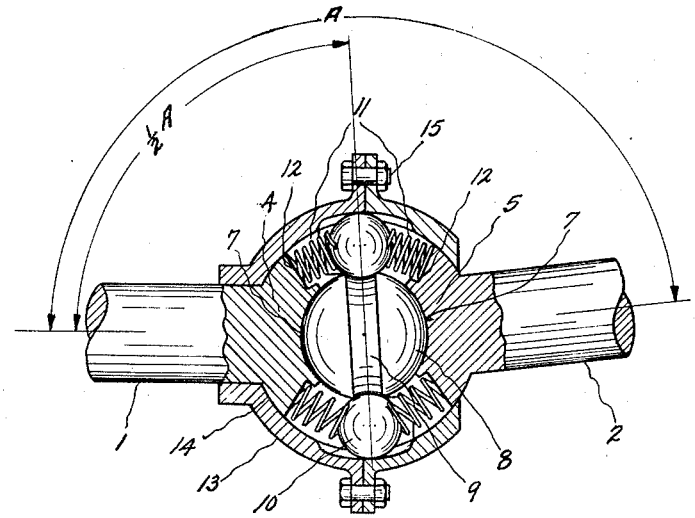
Fig. IV.
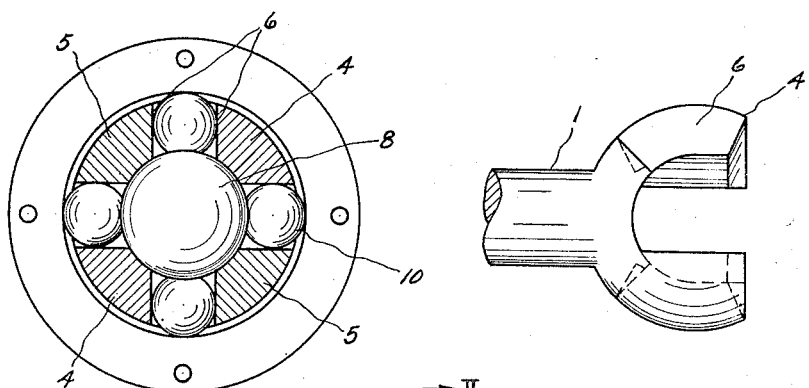
Fig. II. Fig. III.
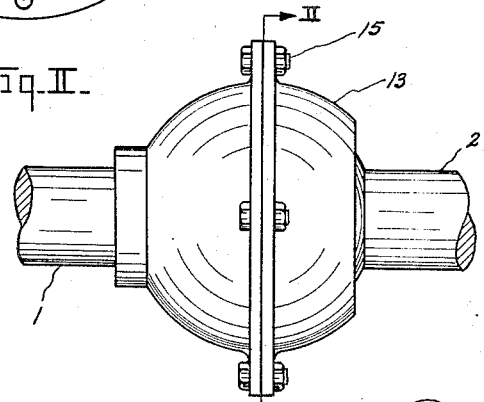
Fig. I.
INVENTOR.
Solon J. Boughton Patented June 12, 1928.

1,673,492

UNITED STATES PATENT OFFICE.

SOLON J. BOUGHTON, OF TOLEDO, OHIO, ASSIGNOR TO THE WILLYS-OVERLAND COMPANY, OF TOLEDO, OHIO, A CORPORATION OF OHIO.

UNIVERSAL JOINT.

Application filed July 26, 1926. Serial No. 124,828.

This invention relates to universal joints for transmitting motion between two mutually inclined shafts.

One of the objects of the invention is to provide a joint that is easily machined and assembled.

Another object of the invention is to provide a universal joint that is capable of transmitting identical angular velocities between two mutually inclined shafts.

Another object of the invention is to provide a universal joint in which the driving members have a rolling contact.

Other objects of the invention will appear from the description to follow covering one embodiment of the invention, which for the purposes of the present application I have illustrated in the accompanying drawings in which:

Figure I is a side elevation of the assembled joint.

Fig. II is a sectional view taken on line II—II of Fig. I.

Fig. III is a detail view of one of the complementary yokes forming the joint, and Fig. IV is a vertical longitudinal section of the joint shown in Fig. I but with the shafts relatively inclined to each other.

Referring to the drawings, in which like characters refer to like parts throughout the views, 1 and 2 are shafts connected by a universal joint 3 which permits either shaft to transmit motion to the other at various included angles of the shafts 1 and 2.

Universal joints are ordinarily constructed by assembling two coacting yokes that are pivotally connected by two axes at right angles to each other, each of which is at right angles to its respective shaft. Joints of this type do not transmit identical motion between two inclined shafts and if the driving shaft be rotated at a constant speed the driven shaft will be accelerated and retarded twice during each revolution.

The present joint transmits identical motion between the shafts at all angles of the shafts within the angular limits of the joint, by having the contact between the yokes lie in a plane that bisects the angle between the shafts. The effect of this contact relation is similar to that of a pair of bevel gears, used to transmit constant motion between two inclined shafts, in which it may be seen that the pitch line of contact must bisect the angle between the shafts. In the present embodiment of the invention, the before mentioned identical motion is secured by forming similar yokes 4 and 5 on the shafts 1 and 2 respectively, each of which has faces 6, that in the assembled relation of the joint are mutually parallel with the opposing faces 6 of the other yoke. Yokes 4 and 5 have central hemispherical depressions 7 for the reception of a spherical member 8, in which is a peripheral groove 9.

Rolling members, preferably balls 10, are interposed between each pair of opposed faces 6, and should substantially bridge the space between the faces in order to eliminate lost motion. The centers of balls 10 are all held in a plane which intersects the center of the joint, by means of the relation between the balls and the peripheral groove 9 in the spherical member. Springs 11 are located on opposite sides of balls 10 and co-act with shoulders 12 for urging the balls toward the opposite yoke. It is desired to have the plane of the balls bisect the angle between the shafts and all springs are constructed substantially the same in order to have the balls 6 reach an equilibrium midway between opposing shoulders 12.

A housing 13 surrounds the joint assembly, being preferably formed in two parts, one of which is secured to one shaft and the other of which is secured to the first by bolts 15 so as to have a movable relation to the remaining shaft. A spherical surface 14, concentric with the joint center is formed within the housing 13 for permitting movement of the balls about the joint center and to hold them within the groove 9. Yokes 4 and 5 are lightly held in contact with spherical member 8 by the housing parts but care should be taken to insure freedom of movement between the yokes and spherical member.

In the operation of the joint the balls 10 will be acted upon by each of the rotating shafts 1 and 2. If the shafts be inclined as shown in Fig. IV the centrifugal force produced by the rotation of each shaft will have a tendency to arrange the plane of the balls at right angles to the respective shaft axes and the position assumed by the plane of the balls will depend upon the resultant of the two forces and will be midway between the two right angle planes, which is the bisecting plane of the included shaft angle. It is possible that at low shaft speeds the centrifugal force will not be great enough to locate the plane of the balls in the median position, but in the embodiment of the invention shown in the drawing the springs 11, between pairs of which each ball is balanced, will supplement centrifugal force and thus assist in causing the plane of the balls to move into and remain in the desired median position. Hence I prefer to employ the springs, although I do not regard them as absolutely essential.

While I have illustrated and described somewhat in detail one embodiment of the invention, it is to be understood that this showing and description are illustrative only and that I do not regard the invention as limited to the details of construction illustrated and described except in so far as I have included such limitations within the terms of the following claims.

I claim as my invention:

1. In a universal joint, the combination of two coacting yokes having pairs of opposed longitudinal faces, a rolling member interposed between the faces of each pair; a centering member for said yokes, said centering member having a peripheral groove adapted to retain said rolling members in a plane intersecting the center of the joint; and a housing adapted to restrain said rolling members within said groove.

2. In a universal joint, the combination of two coacting yokes having pairs of opposed longitudinal faces, a rolling member interposed between the faces of each pair, said yokes having complementary hemispherical depressions therein; a centering member within said depressions, said centering member having a peripheral groove thereon for maintaining said rolling members in a plane intersecting the center of the joint; and a housing for the joint adapted to restrain the rolling members within said groove.

3. In a universal joint, the combination of two coacting yokes having pairs of mutually parallel opposed longitudinal faces and complementary depressions therein; a rolling member interposed between the faces of each pair; a center member within said depressions and rotatable therein, said centering member having a peripheral groove for retaining said rolling members in a plane intersecting the center of the joint; and means for holding said rolling members within said groove.

4. In a universal joint, the combination of two coacting yokes having pairs of mutually parallel opposed longitudinal faces, said yokes having complementary hemispherical depressions therein; a ball interposed between the faces of each pair; a centering member within said depressions having a peripheral groove for maintaining said balls in a plane intersecting the center of said joint; and a housing adapted to hold said yokes in cooperative relation with said centering member and to restrain said balls within said groove.

5. In a universal joint for connecting a pair of shafts, the combination of two coacting yokes having pairs of opposed longitudinal driving faces; a rolling member interposed between each pair of faces; a centering member for maintaining said rolling members in a plane intersecting the center of said joint, said member being pivotally movable about said center; springs interposed between said rolling members and said yokes for urging said rolling members to take a position in a plane bisecting the angle between the shafts; and means for holding all of said parts in assembled relation.

6. In a universal joint for connecting a pair of shafts, two coacting yokes having opposed longitudinal driving faces; a rolling member bridging the space between the faces of each pair; a central generally spherical member against which said yokes have bearing; and means for holding said rolling members in position upon said spherical member in a plane bisecting the angle made by the shafts.

7. In a universal joint for connecting a pair of shafts, the combination of two coacting yokes having pairs of opposed driving faces; a rolling member between the faces of each pair; a centering member for said yokes having a peripheral groove adapted to retain said rolling members in a plane intersecting the center of the joint; springs interposed between said rolling members and said yokes for urging said rolling members to take a position in a plane bisecting the angle between the shafts; and means for holding all of said parts in assembled relation.

8. In a universal joint for connecting a pair of shafts, the combination of two yokes having pairs of opposed driving faces; a rolling member interposed between the faces of each pair of said yokes having complementary hemispherical depressions therein; a centering member within said depressions, said centering member having a peripheral groove therein for retaining said rolling members in a plane intersecting the center of said joint; springs interposed between said rolling members and said yokes for urging said rolling members to take a position in a plane bisecting the angle between the shafts; and means for holding said rolling members within the groove.

9. In a universal joint for connecting a pair of shafts, the combination of two coacting yokes having pairs of mutually parallel opposed driving faces and complementary central depressions; a rolling member interposed between the faces of each pair a centering member within said depressions and rotatable therein, said centering member having a peripheral groove for retaining said rolling members in a plane intersecting the center of the joint; a series of opposed pairs of springs interposed between said rolling members and said yokes for urging said rolling members to take a position in a plane bisecting the angle between the shafts; and means for holding said rolling members within said groove.

10. In a universal joint for connecting a pair of shafts, the combination of two co-acting yokes having pairs of mutually parallel opposed longitudinal faces; said yokes having complementary hemispherical depressions therein; a ball interposed between the faces of each pair; a centering member within said depressions having a peripheral groove for retaining said ball in a plane intersecting the center of the joint; a series of opposed pairs of springs for urging said balls to take a position in a plane bisecting the angle between the shafts; and a housing adapted to hold said yokes in contact with said centering member and to retain said balls within said groove.

In testimony whereof, I affix my signature.

SOLON J. BOUGHTON.